United States Patent
Conkie et al.

(10) Patent No.: US 8,892,441 B2
(45) Date of Patent: *Nov. 18, 2014

(54) SYSTEM AND METHOD FOR INCREASING RECOGNITION RATES OF IN-VOCABULARY WORDS BY IMPROVING PRONUNCIATION MODELING

(75) Inventors: Alistair D. Conkie, Morristown, NJ (US); Mazin Gilbert, Warren, NJ (US); Andrej Ljolje, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 402 days.

This patent is subject to a terminal disclaimer.

(21) Appl. No.: 13/311,512

(22) Filed: Dec. 5, 2011

(65) Prior Publication Data

US 2012/0078617 A1    Mar. 29, 2012

Related U.S. Application Data

(63) Continuation of application No. 12/328,436, filed on Dec. 4, 2008, now Pat. No. 8,095,365.

(51) Int. Cl.
*G10L 15/187* (2013.01)
*G10L 15/06* (2013.01)

(52) U.S. Cl.
CPC ............. *G10L 15/063* (2013.01); *G10L 15/187* (2013.01)
USPC ....................................................... 704/260

(58) Field of Classification Search
CPC ...................................................... G10L 15/187
USPC ..................................................... 704/10, 260
See application file for complete search history.

(56) References Cited

U.S. PATENT DOCUMENTS

| | | | |
|---|---|---|---|
| 6,738,738 B2 | 5/2004 | Henton | |
| 7,266,497 B2 | 9/2007 | Conkie et al. | |
| 7,558,732 B2 | 7/2009 | Kustner et al. | |
| 7,587,320 B2 | 9/2009 | Conkie et al. | |
| 7,668,718 B2 | 2/2010 | Kahn et al. | |
| 8,095,365 B2 * | 1/2012 | Conkie et al. | ................. 704/260 |

* cited by examiner

*Primary Examiner* — Susan McFadden

(57) ABSTRACT

The present disclosure relates to systems, methods, and computer-readable media for generating a lexicon for use with speech recognition. The method includes overgenerating potential pronunciations based on symbolic input, identifying potential pronunciations in a speech recognition context, and storing the identified potential pronunciations in a lexicon. Overgenerating potential pronunciations can include establishing a set of conversion rules for short sequences of letters, converting portions of the symbolic input into a number of possible lexical pronunciation variants based on the set of conversion rules, modeling the possible lexical pronunciation variants in one of a weighted network and a list of phoneme lists, and iteratively retraining the set of conversion rules based on improved pronunciations. Symbolic input can include multiple examples of a same spoken word. Speech data can be labeled explicitly or implicitly and can include words as text and recorded audio.

20 Claims, 3 Drawing Sheets

SYSTEM AND METHOD FOR INCREASING RECOGNITION RATES OF IN-VOCABULARY WORDS BY IMPROVING PRONUNCIATION MODELING

PRIORITY INFORMATION

The present application is a continuation of U.S. patent application Ser. No. 12/328,436, filed Dec. 4, 2008, the content of which is included herewith in its entirety.

BACKGROUND OF THE INVENTION

1. Field of the Invention

The present invention relates to speech processing and more specifically to speech recognition.

2. Introduction

Telephone based customer service is a tremendous expense for businesses. Many recent advances have facilitated automation of numerous aspects of customer service in this sector, saving millions of dollars. Early attempts at automation involved speech synthesis by a computing device and user input in the form of button presses. More modern telephone system automation uses speech recognition to allow callers to interact more naturally. However, accurate and dependable speech recognition relies on a transcription lexicon capable of converting between words and phonemes. Lexicon accuracy is one factor influencing recognition accuracy. A lexicon can be deficient if it fails to contain words to be recognized, or so called Out Of Vocabulary (OOV) words. The lexicon can also be deficient if it contains inaccurate transcriptions, or only has a single transcription for a word when the word is pronounceable in more than one way, as is the case with many proper names. In an automated speech recognition system or an interactive voice response system, inaccurate speech recognition is extremely detrimental. Although such systems can save significant amounts of money when compared to hiring people to answer phones, if callers are frustrated by poor speech recognition, the cost savings can be outweighed by loss of goodwill.

Accordingly, what is needed in the art is an improved way to generate lexica which allow for more accurate speech recognition.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for generating a lexicon for use with speech recognition. The method includes receiving symbolic input as labeled speech data, overgenerating potential pronunciations based on the symbolic input, identifying best potential pronunciations in a speech recognition context, and storing the identified best potential pronunciations in a lexicon. Overgenerating potential pronunciations can include establishing a set of conversion rules for short sequences of letters, converting portions of the symbolic input into a number of possible lexical pronunciation variants based on the set of conversion rules, modeling the possible lexical pronunciation variants in one of a weighted network and a list of phoneme lists, and iteratively retraining the set of conversion rules based on improved pronunciations. Symbolic input can include multiple examples of a same spoken word. Speech data can be labeled explicitly or implicitly and can include words as text and recorded audio. Identifying best potential pronunciations can be based on a threshold.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
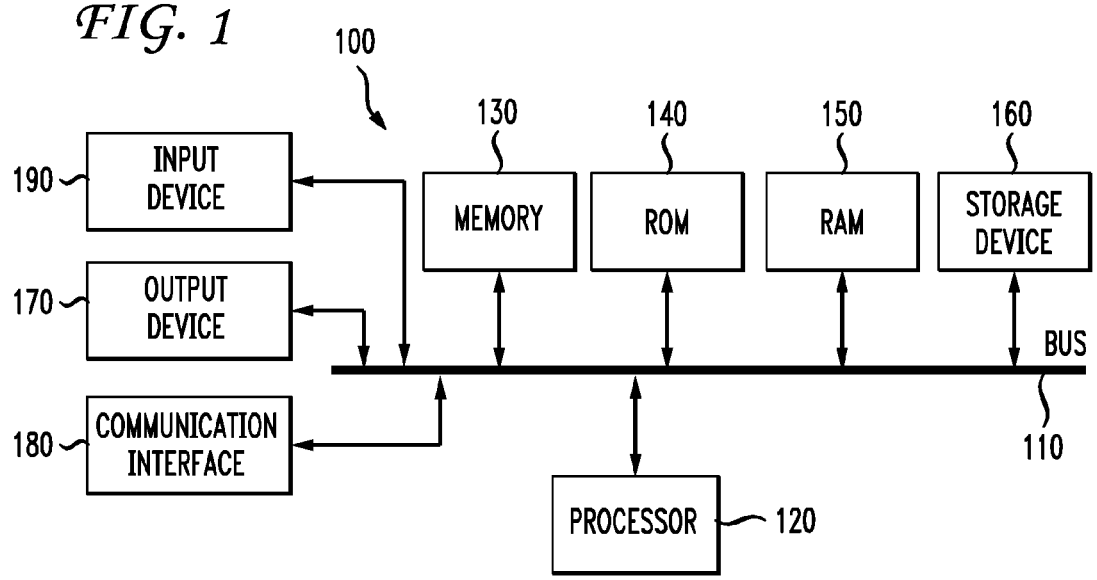
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
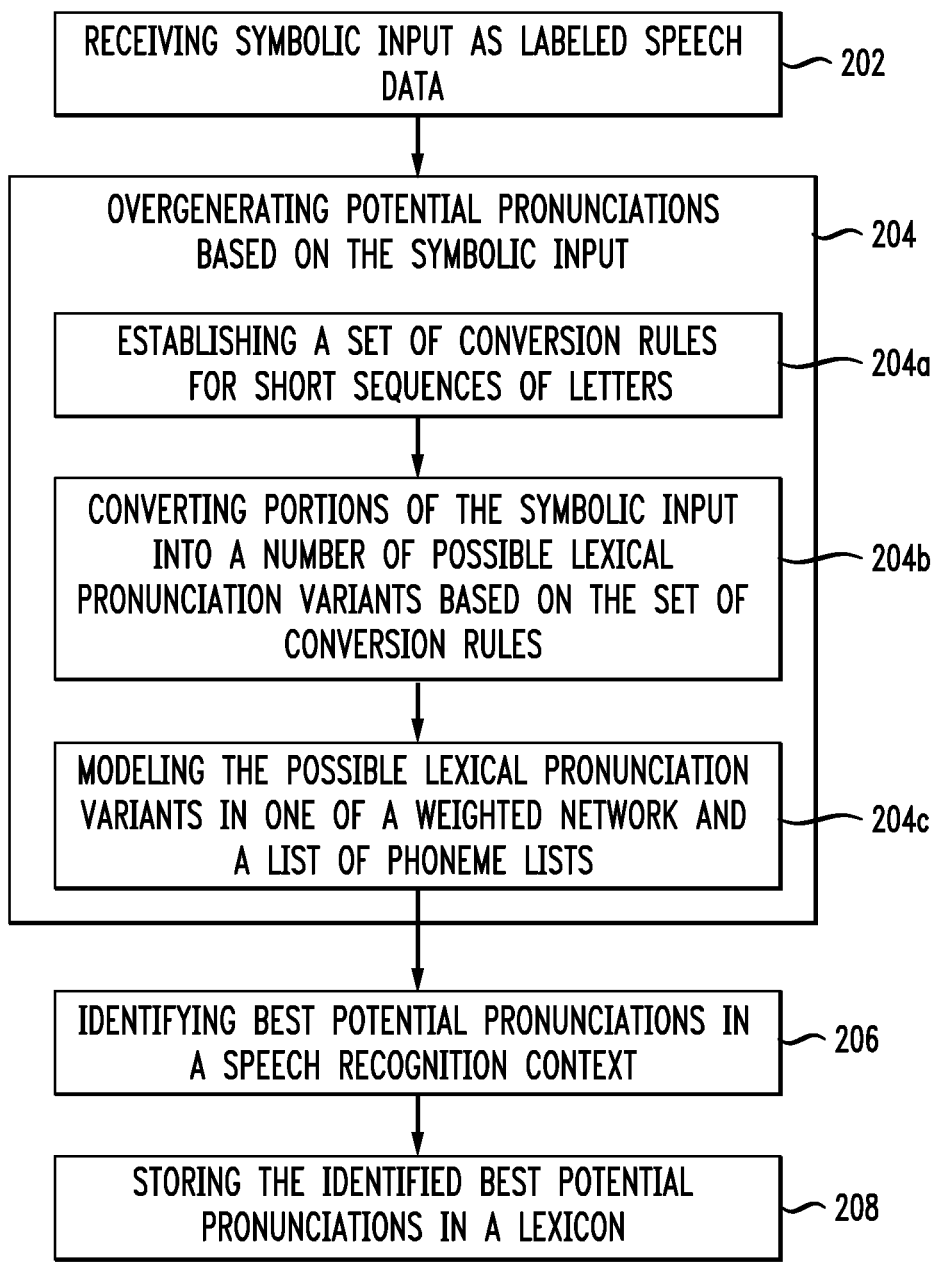
FIG. 2 illustrates an example method embodiment.

Having disclosed the elements of a basic system, the disclosure turns to the method embodiment. The method is discussed in terms of a system configured to practice the method. FIG. 2 illustrates an example method embodiment. The system receives parallel symbolic and audio data as (202). Input can include multiple examples of a same spoken word. This variety of rate, voice quality, accent, gender, age, and other speech sample attributes of the same spoken word in the training data can lead to a more robust lexicon. The labeled speech data includes text as well as recorded audio. With fixed text and audio, the problem is one of forced recognition where the only variable to be modified is lexical contents. The system performs this modification with the goal of increasing the recognition score. Furthermore the system can perform these modifications without supervision.

The system overgenerates potential pronunciations based on the symbolic input (204), meaning that the system generates far more pronunciations than what is needed. The system can use knowledge of how text is likely to be spoken to limit the number of recognition candidates. The system needs to control overgeneration of potential pronunciations or else spurious transcriptions, combinatorial problems, or other issues can arise. The system can convert text to phonemes using a method based on L&K[1]. One way to overgenerate potential pronunciations is to establish a set of conversion rules for short sequences of letters (204*a*), convert portions of the symbolic input into a number of possible lexical pronunciation variants based on the set of conversion rules (204*b*), and model the possible lexical pronunciation variants as either a weighted network or a list of phoneme lists (204*c*). The system can optionally iteratively retrain the set of conversion rules based on improved pronunciations. One conversion rule for short sequences of letters is converting LM to /l//m/(as in the name 'Kilmartin') and converting LM to /m/ (as in the word 'palm'). The system can assign appropriate contexts and/or weights to rules as an indication of how likely they are to be appropriate. Based on these rules the system converts the letters of a word and into a number of possible lexical pronunciations. Under certain circumstances modeling the lexical entries as weighted networks makes more sense than modeling them as a long list of phoneme lists. The system can then test these variants for suitability and retain the best. The system can then use information about the rules used to generate the most successful variants to modify weights associated with rules, using an iterative approach, to further refine the rules used for variant/candidate generation. In this manner, the system assigns a greater weight to more successful rules and a lesser weight to less successful rules. If a rule's weight is extremely low, the system can drop the rule altogether.

If a user or administrator notices that the system is creating sub-optimal pronunciations, this sub-group of steps provides one way for the administrator to fix the problem at the source. Conversion rules can be retrained as needed. The system can substitute different sets of conversion rules for specific applications. In other words, the same set of symbolic input can generate a very different lexicon in the end if processed by a set of differently tuned rules. The system can participate in a more general iterative approach which retrains the acoustic models based on improved pronunciations over and over to achieve some level of convergence.

The system then identifies best potential pronunciations in a speech recognition context (206). A dynamic or static threshold can help identify best potential pronunciations.

The system stores the identified best potential pronunciations in a lexicon (208). The best potential pronunciations in the lexicon can enable higher speech recognition accuracy.

Figure 3:
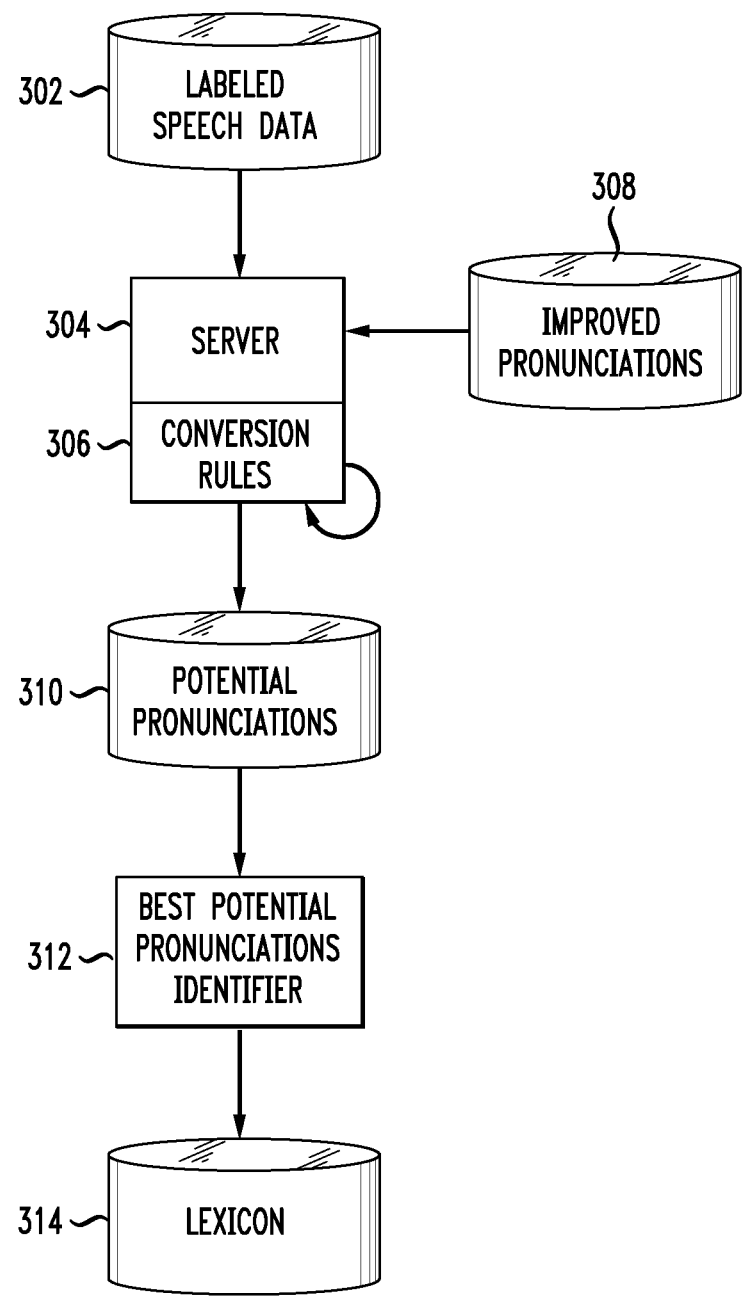
FIG. 3 illustrates a process flow from labeled speech data to a lexicon.

FIG. 3 illustrates a process flow from labeled speech data to a lexicon. Labeled speech data 302 is passed to a server 304. The server applies conversion rules 306 to the speech data. If the conversion rules are not producing acceptable conversion output, improved pronunciations 308 can train and retrain the conversion rules 306 iteratively. The conversion rules output a set of potential pronunciations 310. An identifier 312 selects the best potential pronunciations and inserts them into a lexicon 314 for use with speech recognition. This approach yields lexica that are better suited to speech recognition and can increase recognition accuracy. This approach can improve the automated speech recognition general lexicon of names, help generate lexica for "Spanglish" or other pidgin languages.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to any speech recognition application that requires a lexicon. Those skilled in the art will readily recognize various modifications and changes that may be made to the present invention without following the example embodiments and applications illustrated and described herein, and without departing from the true spirit and scope of the present invention.

We claim:

1. A method comprising:
overgenerating potential pronunciations by converting portions of symbolic input into a number of possible lexical pronunciation variants based on an established set of conversion rules, wherein the symbolic input comprises labeled speech data;
identifying, via a processor of a computing device, potential pronunciations in a speech recognition context to yield identified potential pronunciations; and
storing the identified potential pronunciations in a lexicon.

2. The method of claim 1, wherein the symbolic input comprises multiple instances of a same spoken word.

3. The method of claim 1, wherein the labeled speech data is explicitly labeled.

4. The method of claim 1, wherein the labeled speech data is implicitly labeled.

5. The method of claim 1, wherein the labeled speech data comprises text and recorded audio.

6. The method of claim 1, wherein the possible lexical pronunciation variants are modeled in one of a weighted network and phoneme lists.

7. The method of claim 1, further comprising iteratively retraining the established set of conversion rules based on improved pronunciations.

8. The method of claim 1, wherein identifying potential pronunciations is based on a threshold.

9. A system comprising:
a processor;
a computer-readable storage medium having instructions stored which, when executed by the processor, cause the processor to perform operations comprising:
overgenerating potential pronunciations based on symbolic input by converting portions of the symbolic input into a number of possible lexical pronunciation variants based on an established set of conversion rules, wherein the symbolic input comprises labeled speech data;
identifying potential pronunciations in a speech recognition context to yield identified potential pronunciations; and
storing the identified potential pronunciations in a lexicon.

10. The system of claim 9, wherein the symbolic input comprises multiple instances of a same spoken word.

11. The system of claim 9, wherein the labeled speech data is one of explicitly labeled and implicitly labeled.

12. The system of claim 9, wherein the labeled speech data comprises text and recorded audio.

13. The system of claim 9, wherein the possible lexical pronunciation variants are modeled in one of a weighted network and phoneme lists.

14. The system of claim 9, the computer-readable storage medium having additional instructions which result in operations comprising iteratively retraining the established set of conversion rules based on improved pronunciations.

15. The system of claim 9, wherein identifying potential pronunciations is based on a threshold.

16. A computer-readable storage device having instructions stored which, when executed by a computing device, cause the computing device to perform operations comprising:
   overgenerating potential pronunciations based on symbolic input by converting portions of the symbolic input into a number of possible lexical pronunciation variants based on an established set of conversion rules, wherein the symbolic input comprises labeled speech data;
   identifying potential pronunciations in a speech recognition context to yield identified potential pronunciations; and
   storing the identified potential pronunciations in a lexicon.

17. The computer-readable storage device of claim 16, wherein the labeled speech data comprises text and recorded audio.

18. The computer-readable storage device of claim 16, wherein the possible lexical pronunciation variants are modeled in one of a weighted network and phoneme lists.

19. The computer-readable storage device of claim 16, having additional instructions stored which result in operations comprising iteratively retraining the established set of conversion rules based on improved pronunciations.

20. The computer-readable storage device of claim 16, wherein identifying potential pronunciations is based on a threshold.

* * * * *